(No Model.)
E. N. BACHELDER & F. E. LOVEJOY.
GRAIN METER.
No. 462,680. Patented Nov. 10, 1891.
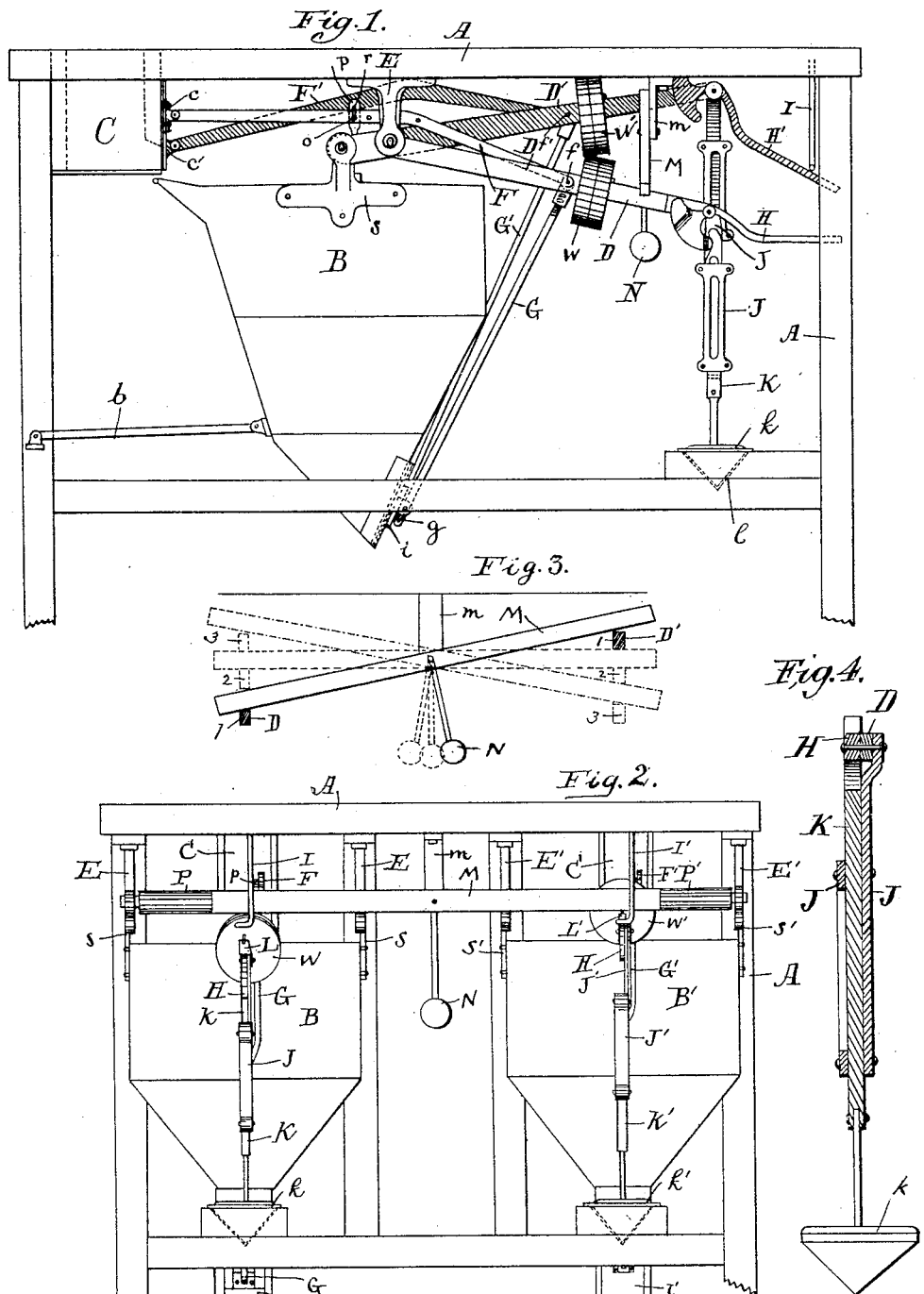

UNITED STATES PATENT OFFICE.

ELMER N. BACHELDER AND FRED E. LOVEJOY, OF PORTLAND, MAINE.

GRAIN-METER.

SPECIFICATION forming part of Letters Patent No. 462,680, dated November 10, 1891.

Application filed January 9, 1891. Serial No. 377,195. (No model.)

*To all whom it may concern:*

Be it known that we, ELMER N. BACHELDER and FRED E. LOVEJOY, citizens of the United States, residing at Portland, in the county of Cumberland and State of Maine, have invented certain new and useful Improvements in Automatic Scales; and we do hereby declare the following to be a full, clear, and exact description of the invention, such as will enable others skilled in the art to which it appertains to make and use the same.

Our invention relates to automatic scales in which successive weights of grain or other material are automatically weighed out and discharged.

Our present invention relates particularly to certain improvements in the apparatus described in Letters Patent granted to us August 6, 1889, No. 408,450, and March 11, 1890, No. 423,204. The above-mentioned apparatus consists of a scale-beam having a weighing-tank thereon, with valves for controlling the supply and discharge pipes, which are operated by the rising and falling of the scale-beam. A tripping weight-carrier is provided which is adapted to depend from said scale-beam and to engage the same when it is depressed with a tripping device for disengaging it when it has lifted a certain distance.

The principal object of our present invention is to combine such scales so that the operation of one scale will set the other, thus making their action continuous and automatically weighing out any desired quantity of material without manual labor.

A further object of our invention is to adapt the principles embodied in our liquid scale to a scale for weighing grain or other solids.

A further object of our invention is to provide means for centering the detachable weight-carrier, so that it may be lifted from the same spot each time without friction.

To accomplish these ends we construct two scales on substantially the same principle as our liquid scales already mentioned, and these are placed side by side, their scale-beams being connected by a lever or other equivalent mechanism, by which when one is lifted by the weight in the weighing-bucket the other is depressed and set. The supply and discharge valves we connect with levers directly with the scale-beam, and a conical or tapering seat is provided for the weight-carrier, into which it drops and centers accurately and from which it can be lifted without friction, all of which will be hereinafter fully described and claimed.

We illustrate our invention in the accompanying drawings, in which—

Figure 1 is a side view of our double scale. Fig. 2 is an end view of the same, and Fig. 3 is a diagram showing the operation of the connecting-lever. Fig. 4 is a central vertical section through the weight, taken at right angles to the view shown in Fig. 1.

In designating the parts of the two scales we have made use of similar letters for each scale, using prime-marks in one scale and plain letters in the other.

A represents the frame-work of the scale, which may be of any suitable character.

D is the scale-beam, and B is the weighing-bucket, which is suspended, as here shown, from the end of the scale-beam by bearings $s$.

E E are the bearings in which the scale-beam is pivoted, and P, Fig. 2, is the cross-bar, the ends of which are pivoted to the bearings E.

C is the supply-hopper, connecting with a suitable reservoir, (not shown,) the outlet of which discharges into the weighing-bucket, and is controlled by the gate or valve $c$. The weighing-bucket is hopper-shaped, and the lower end is provided with a discharge-opening, controlled by a gate or valve $i$. The discharge-opening we make of larger size than the supply-opening, so that the bucket will discharge quicker than it will fill, for the purpose which will be explained later. The lower end of the bucket is steadied by a link $b$, which is pivoted to it and to the frame of the scale.

The valve $c$ is opened and closed by a lever F, which is operated by the scale-beam. As here shown, this lever F is pivoted by one end to the valve $c$ and by the other end to the scale-beam in front of its bearings by means of a pivot $f$. The middle portion of the lever is loosely pivoted to a bearing $p$, which is fixed to the scale-beam, as here shown, back of the bearing; but it may be secured to the frame of the machine, if desired. The bearing has a slot $r$, which allows a certain amount of lost motion before the lever begins to act on the valve. It will be seen that when the scale-beam goes up the valve $c$ closes. The valve $i$ is operated by a rod G, which is loosely pivoted to it by means of a slot $g$ and to the scale-beam above. This connection is such that when the scale-beam rises the valve is pulled open. On the scale-beam is a counter-weight $w$, which brings the beam back to a substantially level position when the bucket is empty. The weight-carrier and its tripping mechanism is substantially as set forth in said Letters Patent No. 408,450, and operates in the same manner.

K is the weight-carrier; J, the guide in which it runs. One side of the guide J extends up and is pivoted to the end of the scale-beam, as clearly shown in Fig. 4. H is the tripping-latch, I the tripping-arm, and $k$ the weight. It will be seen that the weight-carrier K runs or is loosely held within the guide J, and that when the latter is depressed the latch H catches in the notch or recess formed in the upper end of the weight-carrier. Upon being tripped the latch releases the weight-carrier, which falls.

In order to insure the centering of the weight-carrier, so that it will be lifted from exactly the same place each time and without confining it by guides which would produce friction, we allow it to drop into a tapering or conical seat $l$, whereby it is exactly centered each time it falls and is lifted without friction. We prefer to form the lower end of the weight-carrier conical to fit the seat; but this is not absolutely essential.

It will be understood that in describing the parts of one scale, as above, we have described the parts of the other, there being two similar scales placed side by side.

We will now describe the mechanism which is used to connect the two scales and to make one operate the other. For connecting the beams we prefer to use a straight lever M, pivoted midway between the two to a bearing $m$ and extending over the tops of the two scale-beams. The lever is so hung that when one beam is up the other will be forced down sufficiently far to engage the weight-carrier. To the lever is attached a plumbing-weight N, which brings the lever to a level position when it is released by the scale-beam which lifts it.

For the purpose of explaining the operation of the scale, let it be assumed that the left-hand scale-beam, Fig. 3, is down and the right-hand one up, which are the positions taken in the drawings. The supply-valve $c$ in one scale is open and the valve $c'$ is closed. The bucket B is filling and the bucket B' is discharging. The bucket B' will discharge before the other bucket fills, because the discharge-opening is much larger than the filling-opening, as already pointed out. As soon as the bucket B' is empty, the counter-weight will bring the beam down to a level position, (marked in Fig. 3,) and the plumbing-weight on the lever M will cause it to assume the same position, following the beam down. The beam D is held down by the weight, and when it is full it gradually rises, the loose connections formed by the slots $g$ and $r$ preventing the valves from being disturbed, as pointed out in our previous patent, until the tripping-latch H hits the arm I. The weight-carrier K is then released. The beam D, acted on by the weight in the bucket, flies up and hits the lever M, one end of which it raises to the position marked 3, Fig. 3, forcing the other beam down at the same time, so that it engages the weight-carrier. The outlet-valve of the bucket B is at the same time opened and its supply-valve closed, the reverse of which is done with the other bucket. Bucket B now discharges before bucket B' fills, and the operation previously described again takes place, except that the scale-beam D' sets the scale-beam D. This alternate filling and discharging of the two buckets continues indefinitely or so long as there is any material fed through the hoppers. It will be understood that the hopper or other receptacle (not here shown) is provided under each opening below the buckets, so that the contents may be directed into a chute and conveyed to cans, bags, &c., or allowed to accumulate, as desired.

We claim—

1. In an automatic scale, two scale-beams, weighing-buckets suspended therefrom, detachable weight-carriers adapted to engage said scale-beams when the latter is depressed, a lever or other suitable mechanism connecting the two scale-beams and so arranged that when one is raised the other will be depressed to engage said weight-carrier, substantially as described.

2. In an automatic scale, two scale-beams, weighing-buckets suspended therefrom, detachable weight-carriers adapted to engage said scale-beams when the latter are depressed, a lever pivoted between said scale-beams and arranged so that one end will be lifted by each beam, whereby the elevation of one scale-beam will depress the other, substantially as described.

3. In an automatic scale, two scale-beams, weighing-buckets suspended therefrom, counter-weights on said scale-beams, detachable weight-carriers adapted to engage said scale-beams when the latter are depressed, a lever pivoted between said scale-beams and arranged so that one end will be lifted by each beam, and a plumbing-weight on said lever for bringing the same to a level, substantially as described.

4. In an automatic scale, a scale-beam and a weighing-bucket suspended therefrom, a tripping weight-carrier adapted to engage said scale-beam, a supply-hopper for filling said weighing-bucket, a valve for controlling the outlet to said hopper, a lever the ends of which are pivoted to the scale-beam and the said valve, respectively, the central portion being pivoted to a support, a valve for controlling the outlet of said bucket, and a rod connecting said valve with said scale-beam, substantially as described.

5. In an automatic scale, a scale-beam, a tripping weight-carrier adapted to engage the end thereof, the lower end of said weight-carrier fitting a conical recess, into which it falls when it is detached, substantially as described.

In testimony whereof we affix our signatures in presence of two witnesses.

ELMER N. BACHELDER.
FRED E. LOVEJOY.

Witnesses:
S. W. BATES,
E. W. PIERCE.